(12) United States Patent
Scrascia et al.

(10) Patent No.: US 12,156,772 B2
(45) Date of Patent: Dec. 3, 2024

(54) DEVICE FOR DENTAL HYGIENE

(71) Applicant: ADVANCED BRUSH, Rome (IT)

(72) Inventors: Andrea Scrascia, Rome (IT); Antonio Cosimati, Rome (IT)

(73) Assignee: Advanced Brush, Rome (IT)

( * ) Notice: Subject to any disclaimer, the term of this patent is extended or adjusted under 35 U.S.C. 154(b) by 659 days.

(21) Appl. No.: 17/437,128

(22) PCT Filed: Mar. 9, 2020

(86) PCT No.: PCT/IB2020/052013
§ 371 (c)(1),
(2) Date: Sep. 8, 2021

(87) PCT Pub. No.: WO2020/183338
PCT Pub. Date: Sep. 17, 2020

(65) Prior Publication Data
US 2022/0175503 A1    Jun. 9, 2022

(30) Foreign Application Priority Data

Mar. 8, 2019 (IT) .......................... 102019000003441

(51) Int. Cl.
*A61C 17/22* (2006.01)
*A61C 17/26* (2006.01)

(52) U.S. Cl.
CPC ............ *A61C 17/228* (2013.01); *A61C 17/26* (2013.01)

(58) Field of Classification Search
CPC ... A61C 17/22; A61C 17/008; A61C 17/3409; A46B 15/004; A46B 9/045
See application file for complete search history.

(56) References Cited

U.S. PATENT DOCUMENTS

| 4,224,710 A * | 9/1980 | Solow ................. A61C 17/228 15/22.1 |
| 8,631,531 B2 * | 1/2014 | Garner ................ A61C 17/228 15/22.1 |
| 9,848,959 B2 * | 12/2017 | Lowe .................... A61H 13/00 |

(Continued)

FOREIGN PATENT DOCUMENTS

| DE | 8913203 U1 | 3/1991 |
| EP | 3369396 A1 | 9/2018 |
| WO | 2010038171 A1 | 4/2010 |

OTHER PUBLICATIONS

International Search Report and Written Opinion for International Patent Application No. PCT/IB2020/052013, mailed Jun. 22, 2020, 10 pages.

*Primary Examiner* — Michael D Jennings
(74) *Attorney, Agent, or Firm* — Armstrong Teasdale LLP

(57) ABSTRACT

Described herein is a device for dental hygiene, including a brushing apparatus configured to wrap simultaneously all teeth of the upper or lower dental arch, a supporting structure including a covering case configured to be entirely inserted inside the oral cavity and to support the brushing apparatus, and a motorization unit configured to move cleaning elements of the brushing apparatus. The brushing apparatus includes a first brushing assembly configured to act on the vestibular surface of the teeth, a second brushing assembly configured to act on the lingual surface of the teeth, and a third brushing assembly configured to act on the occlusal surface of the teeth.

19 Claims, 8 Drawing Sheets

(56) References Cited

U.S. PATENT DOCUMENTS

Figure 1:
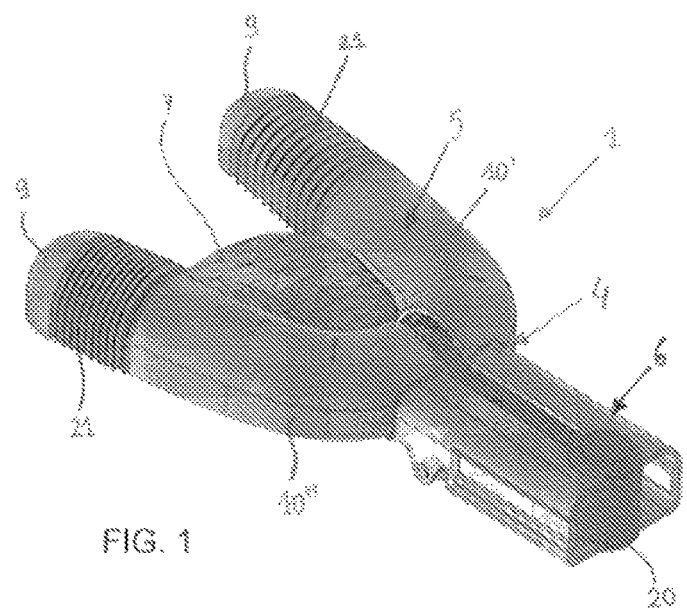

| | | | |
|---|---|---|---|
| 11,583,064 B1* | 2/2023 | Baker | A61C 17/34 |
| 2011/0078867 A1* | 4/2011 | Liangco | A46B 9/026 |
| | | | 15/167.2 |
| 2013/0014331 A1* | 1/2013 | Garner | A61C 17/228 |
| | | | 15/22.1 |
| 2014/0023983 A1* | 1/2014 | Lowe | A61C 7/008 |
| | | | 433/2 |
| 2014/0093836 A1* | 4/2014 | Wolpo | A61N 1/325 |
| | | | 433/32 |
| 2014/0272761 A1* | 9/2014 | Lowe | A61C 17/3481 |
| | | | 433/2 |
| 2015/0282911 A1* | 10/2015 | Steiner | A61C 17/228 |
| | | | 15/22.2 |
| 2018/0098833 A1* | 4/2018 | Pierce | A61C 17/224 |
| 2020/0253369 A1* | 8/2020 | De Gentile | A46B 11/06 |
| 2020/0253702 A1* | 8/2020 | De Gentile | A46B 15/0012 |

* cited by examiner

DEVICE FOR DENTAL HYGIENE

CROSS-REFERENCE TO RELATED APPLICATIONS

This application is a National Phase Application of PCT International Application No. PCT/IB2020/052013, having an International Filing Date of Mar. 9, 2020, which claims priority to Italian Application No. 102019000003441, filed Mar. 8, 2019, each of which is hereby incorporated by reference in its entirety.

The present invention relates to a device for dental hygiene.

Currently, electrical devices for dental hygiene similar to toothbrushes are known and commercially available, in which a head provided with brushes is rotated and/or oscillated by an electric motor.

In addition, devices for dental hygiene are currently known in which the movement of the brushes is caused by the mechanical action extended with the bite, that is, by the mechanical action exerted by the mandible on the jaw.

However, these known solutions are not fully satisfactory since the movement of the bristles on the tooth surface generally extends vertically from the apex of the tooth to the gum, thus conveying the material below the latter. In this way, gingival infections or other diseases can be generated, and in any case the cleaning is not optimal.

In addition, such known devices are not usable in the case of malocclusion and/or malposition of the teeth, as they could cause trauma to the structures of the oral cavity.

In addition, such known devices do not allow the proper use of the toothpaste compound for the proper wetting of the tooth surface.

Last but not least is the fact that the well-known devices are generally impractical.

An object of the invention is to propose a device for dental hygiene that overcomes the aforementioned drawbacks present in the traditional solutions.

Another object of the invention is to propose a device for dental hygiene that is easy, practical, intuitive and quick to use.

Another object of the invention is to propose a device for dental hygiene that performs a correct, effective, rapid and accurate cleaning of all teeth at all their surfaces (vestibular, lingual and occlusal), as well as in the interdental spaces.

Another object of the invention is to propose a device for dental hygiene that is adaptable to palates of different size and/or shape.

Another object of the invention is to propose a device for dental hygiene that allows effectively and definitively removing dirt from the teeth.

Another object of the invention is to propose a device for dental hygiene that optimizes the amount of toothpaste compound used.

Another object of the invention is to propose a device for dental hygiene that allows the correct wetting of the teeth.

Another object of the invention is to propose a device that is particularly suitable for use even by subjects who lack or have reduced autonomy of movement.

Another object of the invention is to propose a device for dental hygiene with an alternative characterization, in terms of both construction and function, compared to traditional ones.

Another object of the invention is to propose a device for dental hygiene that can be obtained in a simple, fast and low-cost manner.

All these objects and others that will result from the description below are achieved, according to the invention, with a device for dental hygiene and a dental cleaning kit as defined in the independent claims.

The device for dental hygiene, in particular for cleaning teeth of a dental arch according to the present invention, comprises a brushing apparatus configured to simultaneously wrap all the teeth of the upper dental arch or lower dental arch, wherein the brushing apparatus comprises a plurality of movable cleaning elements configured to clean said teeth with their free ends.

The device further comprises a supporting structure with a covering case, which is intended to be entirely inserted inside the oral cavity and which is configured to support and accommodate said brushing apparatus therein, said supporting structure further comprising an appendix which is associated with the covering case and/or the brushing apparatus and which, when said covering case is positioned inside the oral cavity, is intended to come out at least in part from said oral cavity through the oral fissure.

In addition, the device comprises a motorization unit configured to implement in movement said cleaning elements, and at least a first brushing assembly comprising a plurality of cleaning elements arranged and configured to act on the vestibular surface of the teeth, at least a second brushing assembly comprising a plurality of cleaning elements arranged and configured to act on the lingual surface of the teeth, and at least a third brushing assembly comprising a plurality of cleaning elements arranged and configured to act on the occlusal surface of the teeth.

According to one embodiment, said covering case has a substantially arched longitudinal extension to substantially cover all the teeth of an arch and, moreover, has a concave cross section to cover the vestibular, lingual and occlusal surfaces of said teeth, and said appendix defines a handle to hold and move said device and, also, defines a casing for said motorized unit and for a battery for supplying said motorized unit.

According to another embodiment, the cleaning elements comprise rotating brushes provided with a core with a longitudinal extension from which radially depart a plurality of thread-like elements and wherein the first brushing assembly comprises a plurality of brushes arranged and configured to act on the vestibular surface of the teeth, the second brushing assembly comprising a plurality of brushes arranged and configured to act on the lingual surface of the teeth, and the third brushing assembly comprising a plurality of brushes arranged and configured to act on the occlusal surface of the teeth. In an alternative embodiment, the thread-like elements extend radially like a spiral from the core with a longitudinal extension.

In particular, the cores of the brushes of the three brushing assemblies extend longitudinally along the extension of the dental arch and along respective directions that are substantially parallel to each other.

In one embodiment, the cores of said brushes are longitudinally extensible/compressible.

According to another embodiment, the cleaning elements comprise continuous brushed ribbons, wherein the first brushing assembly comprises a plurality of continuous brushed ribbons arranged and configured to act on the vestibular surface of the teeth, the second brushing assembly comprising a plurality of continuous brushed ribbons arranged and configured to act on the lingual surface of the teeth, and the third brushing assembly comprising a plurality of continuous brushed ribbons arranged and configured to act on the occlusal surface of the teeth.

In particular, the motorization unit is configured for providing a tilting movement of the cleaning elements in forward and backward direction, and said cleaning elements are located on drive shafts and idle shafts, wherein each of the three brushing assemblies is coupled to one drive shaft, respectively.

In accordance with an embodiment, the device further comprises a transmission box provided with three slots arranged at the drive shafts of the brushing assemblies of the continuous brushed ribbons, respectively.

According to a further embodiment, the motorized unit comprises a single electric motor and a system for transmitting the motion generated by said motor to all the cleaning elements of said three brushing assemblies, said transmission system being provided at the medial area of the arched longitudinal extension of said covering case and/or of said brushing apparatus.

Specifically, the motorized unit and/or said motion transmission system are configured to cause a movement of the cleaning elements of the first brushing assembly, acting on the vestibular surface of the teeth, and of the second brushing assembly, acting on the lingual surface of the teeth, according to a rotation direction going from the gum/crown of the tooth towards its apex. The movement can also be transmitted on the occlusal plane.

According to one embodiment, said covering case is subdivided into two parts at the medial area of its arched longitudinal extension, said two parts being articulated to each other in an adjustable manner around a pin mounted at said appendix. In alternative, the system can be deprived of said pin and the movement or the tilting effect can be provided by the material flexibility due to the properties of the material itself.

According to a further embodiment, the covering case comprises at least one longitudinally extensible portion, preferably configured like a bellows.

In another embodiment, each half-arch ends at the "canine shape" (detection points or land marks: γ e β) from which is possible to assemble one of the two appendixes of different dimensions with the aim of cover the entire length of the half-arches. Each appendix (of two different dimensions) comprises the correspondent cleaning elements, i.e. the brushed elements. The appendixes receive in their structure the extensible/compressible element like a bellows.

The dental cleaning kit according to the present invention comprises a device according to one of the previous embodiments and at least one of the following accessories:
- a gelled toothpaste compound to be inserted inside the covering case of said device and/or to be placed inside the oral cavity before insertion, inside said cavity, of the covering case and brushing apparatus of said device,
- a tooth whitening apparatus to be inserted removably into the covering case of said device, and
- a sanitizing element, preferably of the disposable type, for sanitizing said device.

According to another embodiment, the toothpaste compound can be sprayed on the cleaning elements, i.e. the brushed elements.

The dental cleaning kit according to the present invention comprises a device according to one of the previous embodiments and a base apparatus configured to interface electrically and mechanically with said device for:
- recharging the battery provided in said device, and/or
- automatically cleaning the covering case and the brushing apparatus of said device after use, and/or
- sanitizing said device, preferably by ultraviolet radiation, and/or
- positioning a toothpaste compound inside the covering case of said device, at the brushing apparatus.

Figure 2:
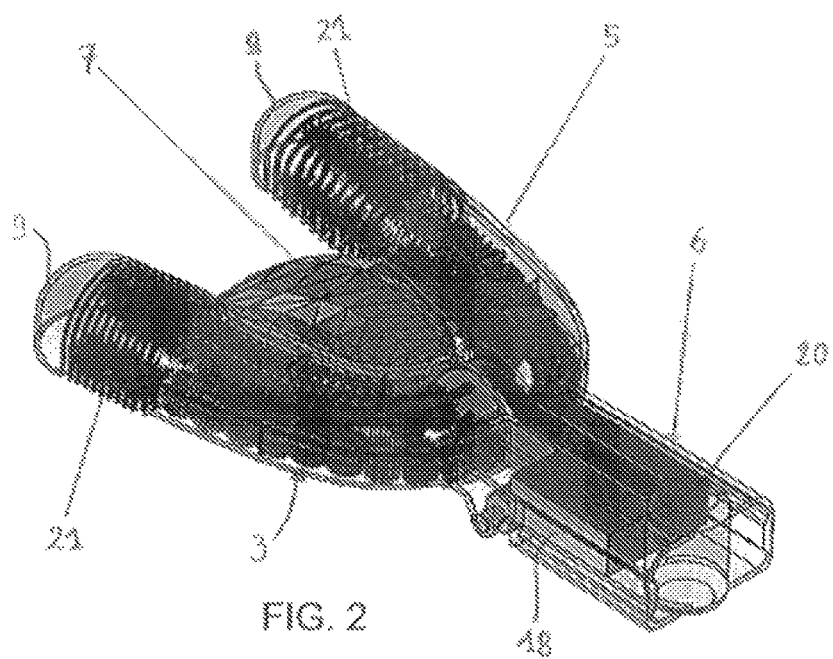
Figure 3:
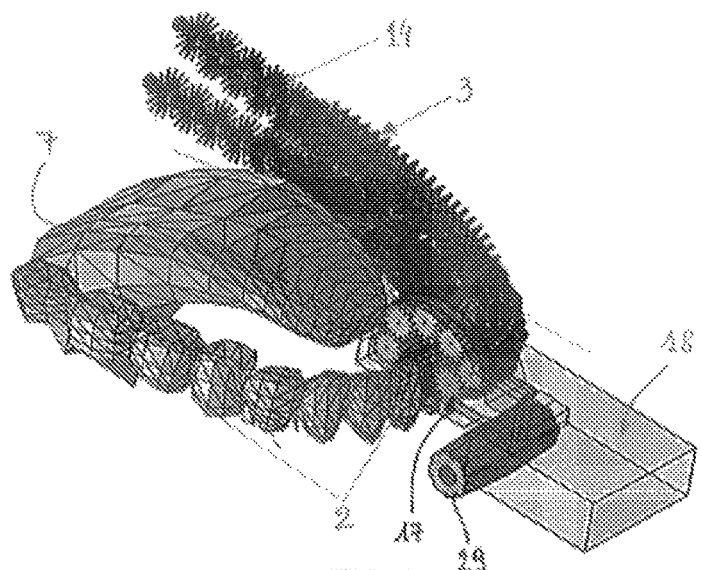
Figure 4:
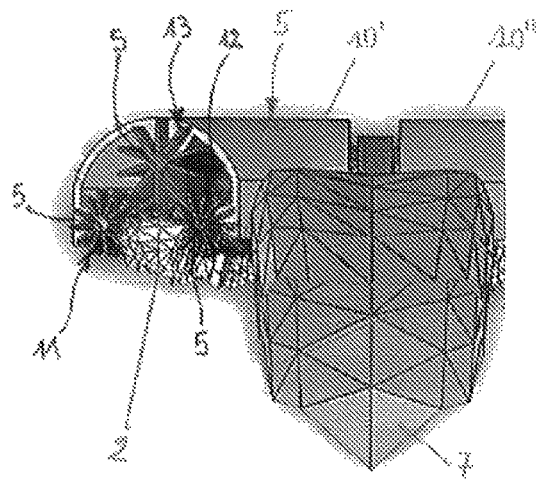
Figure 5:
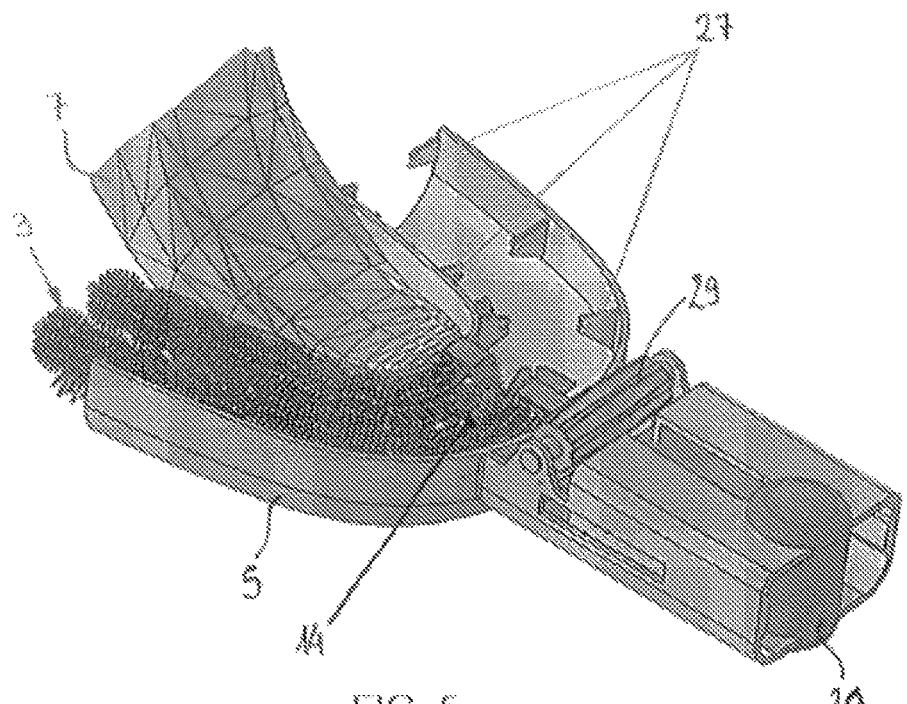
Figure 6:
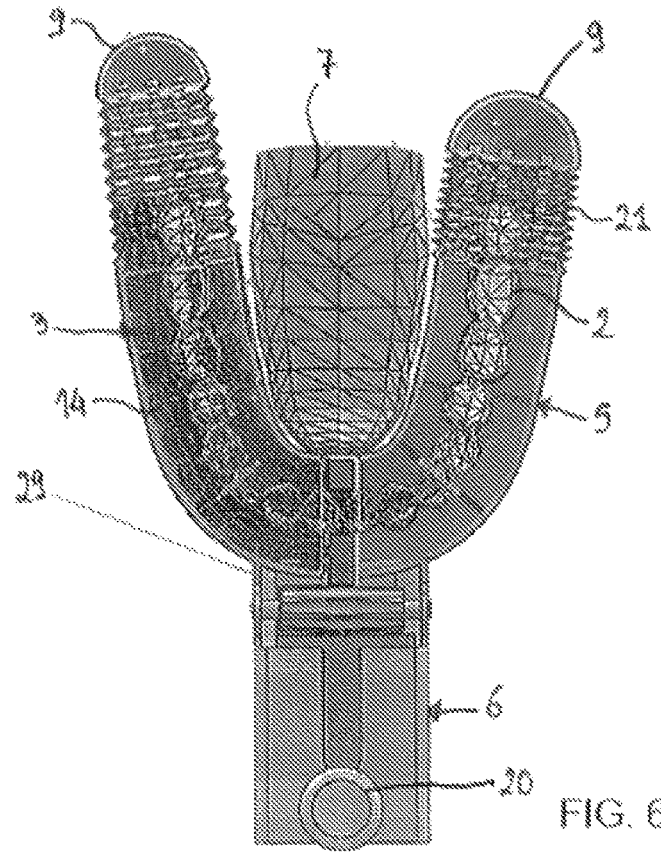
Figure 7:
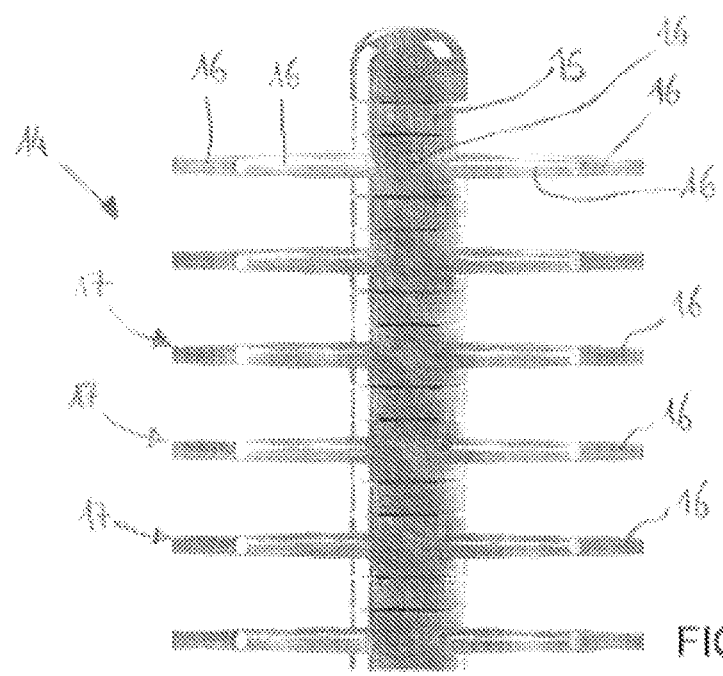
Figure 8:
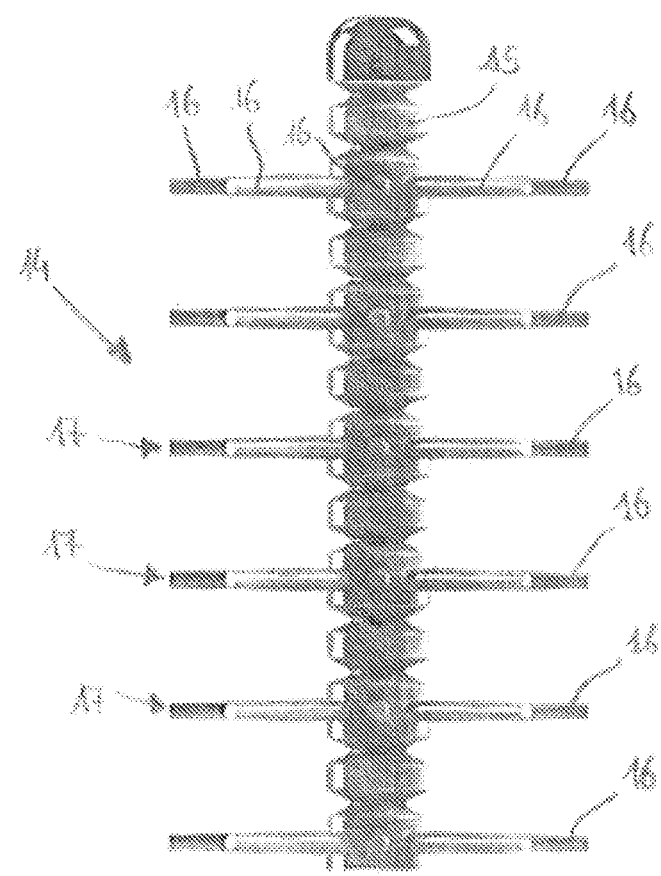
Figure 9:
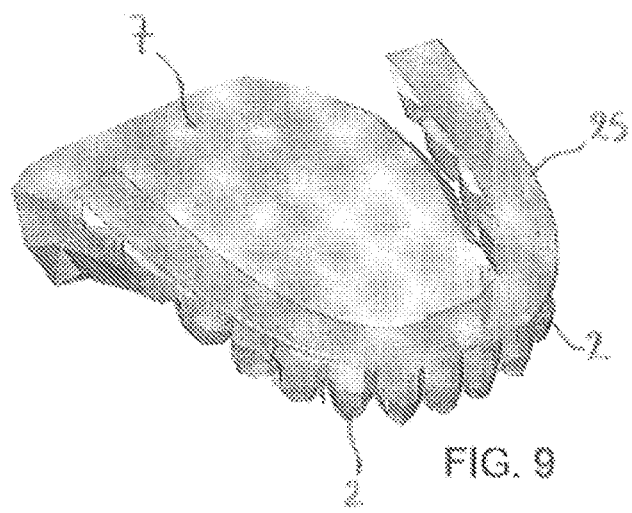
Figure 10:
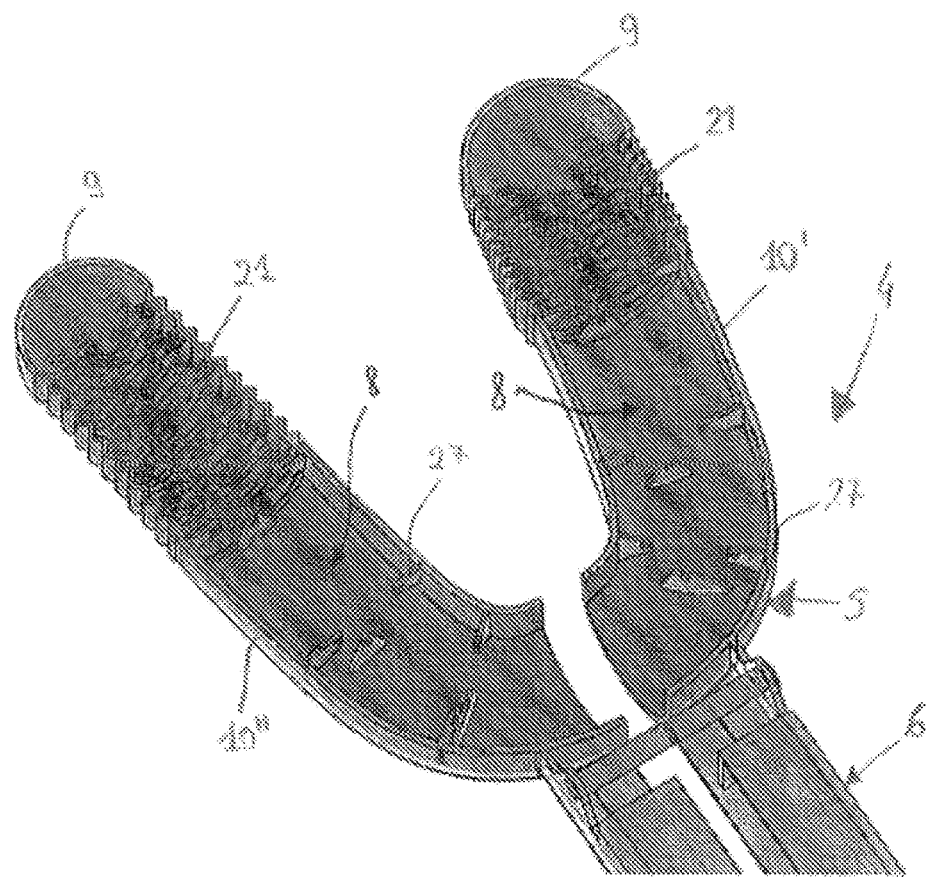
Figure 11:
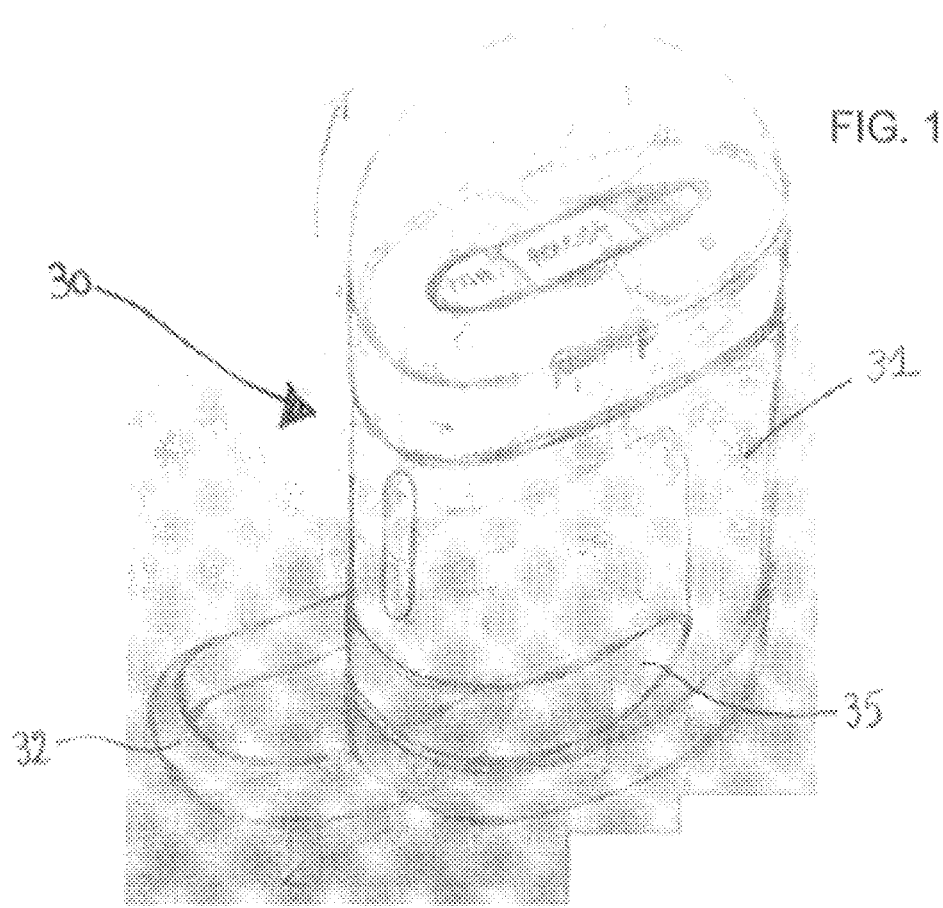
Figure 12:
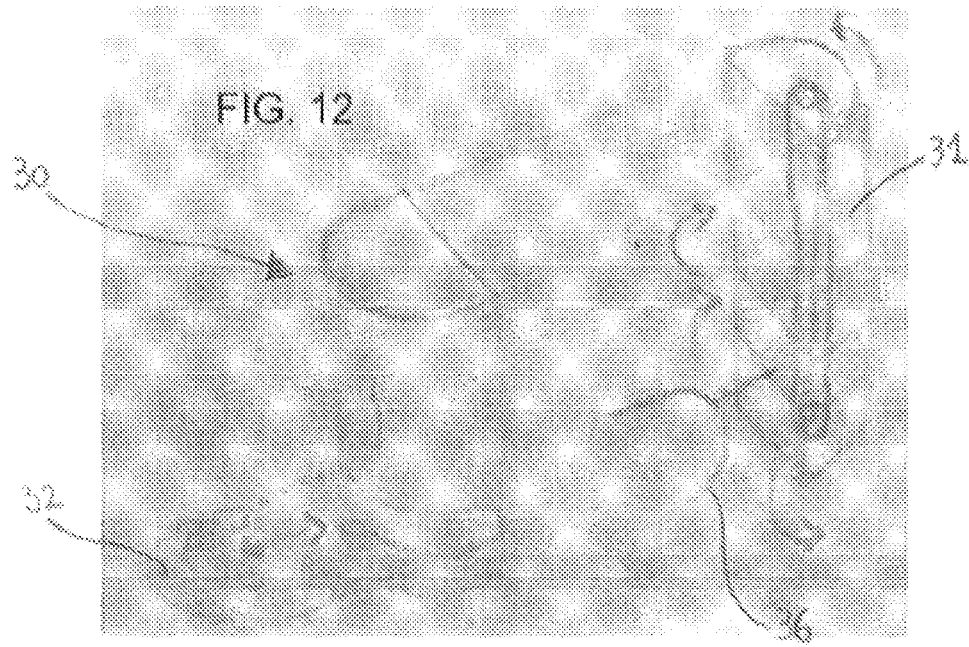
Figure 13:
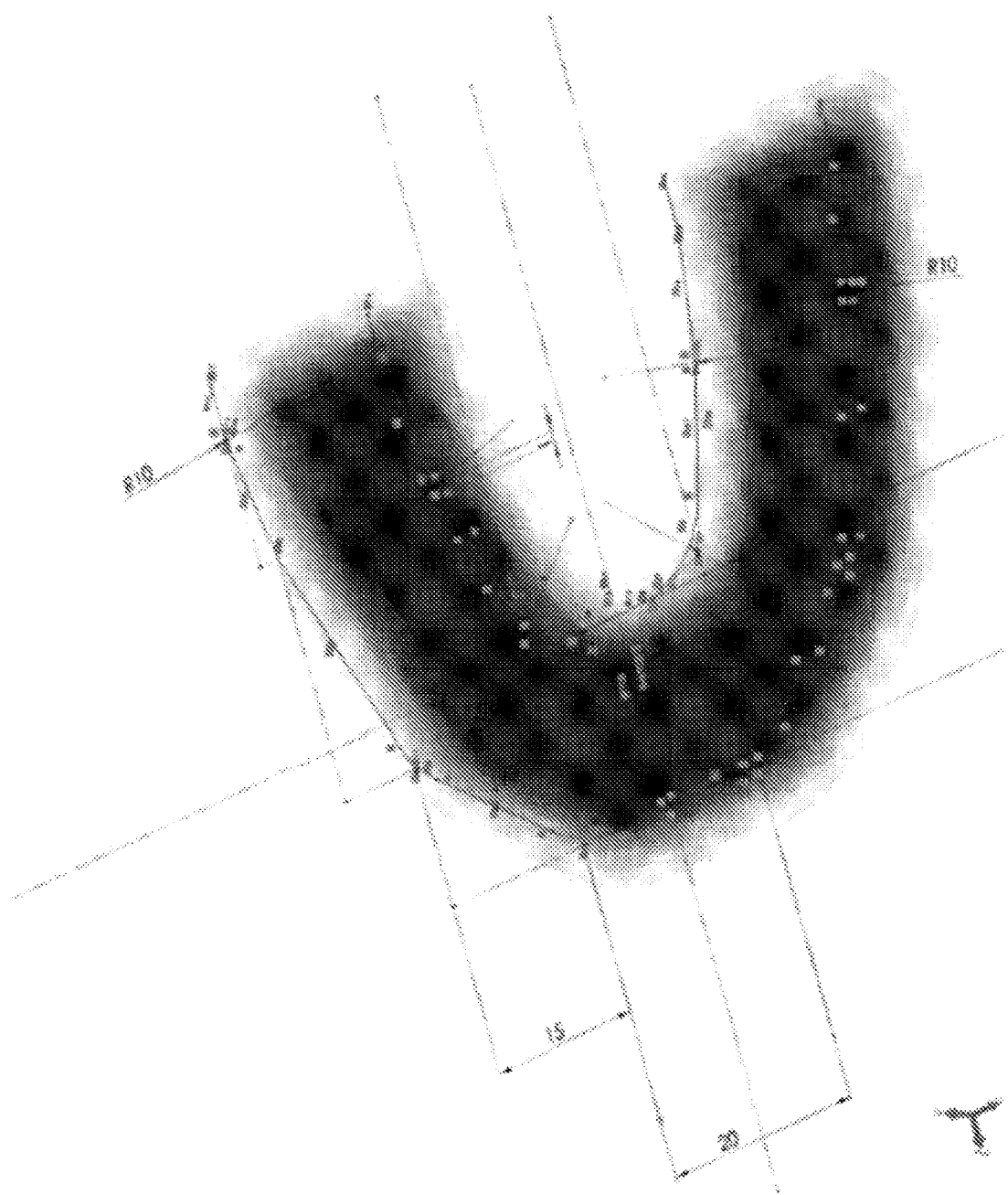
Figure 14:
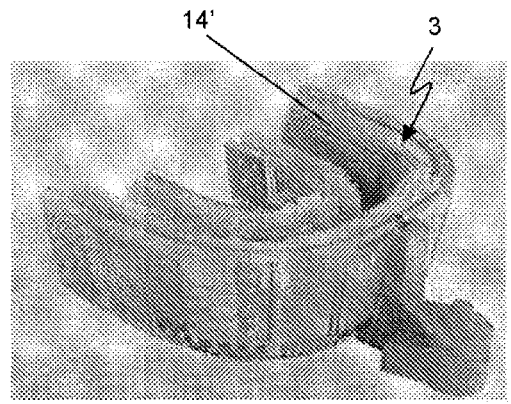
Figure 15:
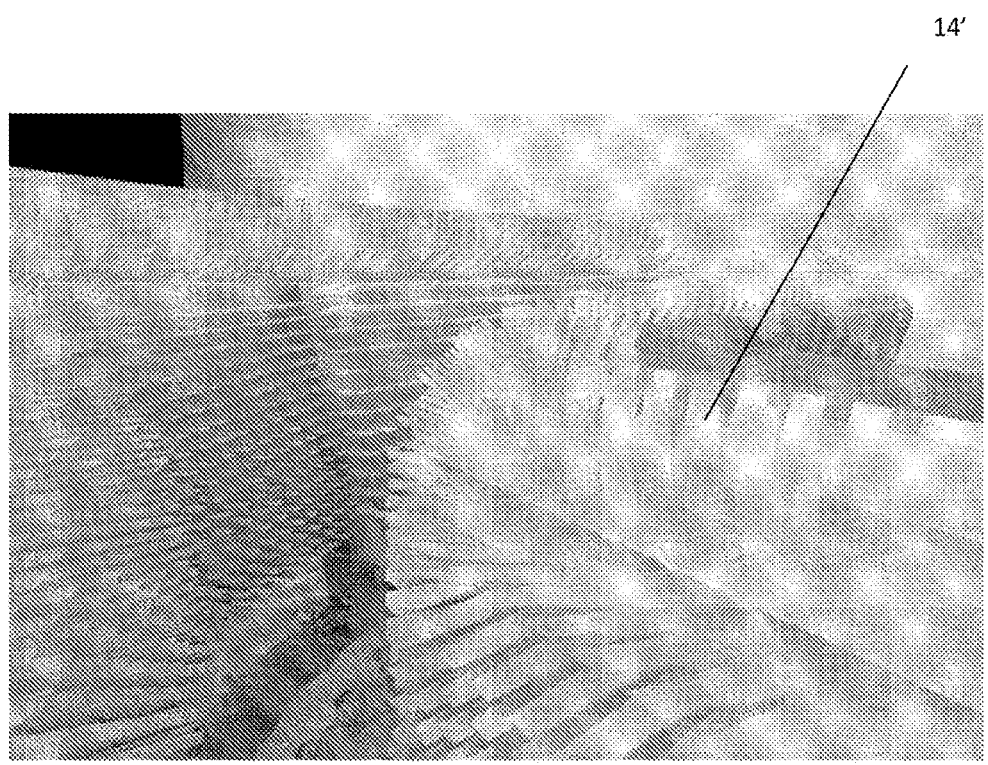

The present invention is further clarified below in some of its preferred embodiments given purely by way of non-limiting example, with reference to the attached drawings, in which:

FIG. 1 shows a perspective view of the device according to the invention, inserted inside the oral cavity, FIG. 2 shows the device with the supporting structure transparent, FIG. 3 shows in perspective view, inside the oral cavity, one half of the brushing apparatus and the transmission system, with the casing of the appendix of the supporting structure transparent, FIG. 4 shows the device, inside the oral cavity, according to a vertical section thereof, FIG. 5 shows the device, inside the oral cavity, in a perspective view in which one half of the brushing apparatus has been removed, FIG. 6 shows the device according to a plan view, inside the oral cavity, in the same condition as FIG. 5 and with the covering case transparent, FIG. 7 shows a brush of the brushing apparatus in a compact configuration in front view, FIG. 8 shows the same brush of FIG. 7 in an extended configuration, FIG. 9 shows the lower dental arch in perspective view with the toothpaste sheet applied, FIG. 10 shows the sole supporting structure of the device according to the invention in perspective view with the concavity facing up, FIG. 11 shows a base apparatus (dock) according to the invention in schematic perspective view, FIG. 12 shows the apparatus of FIG. 11 in a schematic, exploded perspective view, FIG. 13 shows the device according to the invention, FIG. 14 shows the device according to one embodiment of the invention, FIG. 15 shows a detail of the device of FIG. 14.

As seen from the figures, the device 1 for dental hygiene according to the invention, in particular for cleaning teeth 2, comprises a brushing apparatus 3 configured to substantially wrap simultaneously all the teeth of the upper dental arch or the lower dental arch, preferably one arch at a time.

Preferably, the device can act only on one arch at a time.

Suitably, the brushing apparatus 3 has a curved longitudinal extension that substantially follows that of the dental arch to which said device is intended to be applied.

Preferably, the covering case has been further divided into two half-arches for the following advantages:
Increased ease of insertion on the arch
Adaptability on different heights of the masticatory plane
The two half-arches are joined together by an interlocking joint system (for maintaining the dimensions of that specific dental sector). In particular, the two half-arches are joints to form the entire arch.

The device 1 further comprises a supporting structure 4 which, in turn, comprises:
- a covering case 5 which, during the use of said device, is intended to be inserted inside the oral cavity,
- an appendix 6 which is associated with and/or departs from the covering case 5 and which, during the use of said device, is intended to come out at least in part—preferably in large part or in whole—from the oral cavity through the oral fissure.

Suitably, the brushing apparatus 3 is supported and housed inside the covering case 5 so that—when inserted/ positioned inside the oral cavity—said apparatus is separated/isolated, and in particular not in contact with the tongue 7 and the inner surfaces of the lips, thereby allowing their protection. Suitably, the covering case 5 wraps externally—and for the most part or completely—the brushing apparatus 3 and, in addition, has a configuration adapted to wrap simultaneously all the teeth of the upper dental arch or lower dental arch, preferably one arch at a time.

Advantageously, the covering case 5 comprises a protective sheath defining an inner compartment 8 in which the brushing apparatus 3 is housed. Suitably, the inner compartment 8 is opened outwardly to define a tooth insertion passage 2.

Advantageously, the covering case 5—and preferably also the appendix 6—is made of biocompatible polymer material.

Advantageously, the covering case 5 has a substantially arched longitudinal extension, preferably such as to define a substantially "U" shape, to substantially cover all the teeth of an arch. Suitably, the longitudinal ends of the covering case 5 have a section 9 substantially shaped like a dome.

Advantageously, the covering case 5 has a concave cross section, preferably such as to define a substantially "U" shape, which covers the vestibular, lingual and occlusal surfaces of the teeth.

Suitably, the concave cross section of the covering case 5 (which faces upwards when said casing is inserted inside the oral cavity to act on the upper arch and instead faces downwards when the casing is inserted inside the oral cavity to act on the lower arch) delimits said compartment 8 inside which the brushing apparatus 3 is housed and supported.

Preferably, the appendix 6 and the covering case 5 are substantially coplanar and, in particular, the appendix 6 extends along the medial axis of the covering case 5 externally with respect to the arched extension thereof.

Preferably, the covering case 5 consists—along its arched longitudinal extension—of two distinct parts 10' and 10", slightly spaced apart, which are substantially symmetrical with respect to the medial axis thereof (i.e. the axis which—when the casing is inserted inside the oral cavity—passes substantially between the two central incisors).

Advantageously, the appendix 6 is substantially box-shaped, which—when the device 1 is in use (i.e. when the covering case 5 is inserted inside the oral cavity)—is enclosed between the lips and exits, at least in part, outside said cavity.

Preferably, said appendix 6 defines, at least partially, a handle to hold the entire device 1 and to allow the placement of the covering case 5, with the brushing apparatus 3, inside the oral cavity and for their removal therefrom.

Suitably, the brushing apparatus 3 comprises three brushing assemblies, and in particular comprises:
 a first brushing assembly 11 arranged and configured to act on the vestibular surface of the teeth and in the interstitial spaces present between the vestibular surfaces of two adjacent teeth,
 a second brushing assembly 12 arranged and configured to act on the lingual surface of the teeth and in the interstitial spaces present between the lingual surfaces of two adjacent teeth,
 a third brushing assembly 13 arranged and configured to act on the occlusal surface of the teeth and in the interstitial spaces present between the occlusal surfaces of two adjacent teeth.

Suitably, at the area substantially opposite to that intended to come into contact with the occlusal surface of the tooth, the third brushing assembly 13 is externally covered by the bottom of the concavity of the covering case 5; suitably, at the area substantially opposite to that intended to come into contact respectively with the vestibular and lingual surfaces of the tooth, the first 11 and the second brushing assembly 12 are externally covered by the respective side sections, facing each other, of the concavity of the covering case 5.

Suitably, each brushing assembly 11, 12 and 13 comprises one or more cleaning elements, for example one or more brushes 14 aligned with each other or one or more continuous brushed ribbons 14'. Each brushing assembly 11, 12, 13 is associated with a corresponding drive shaft, as described below.

As shown in FIG. 2, in the case of use of brushes 14, each brush 14 of the brushing assemblies 11, 12 and 13 comprises a central core 15 (which is preferably defined by an elongated body) from which radially depart a plurality of thread-like elements 16 that suitably define the bristles of said brush. Advantageously, the thread-like elements 16 are constrained, preferably fixed, on the central core 15. Preferably, the thread-like elements 16 are made of highly biocompatible polymeric material.

Suitably, each brush 14 comprises multiple sets 17 of thread-like elements 16 coplanar to each other and spaced apart along the longitudinal extension of the central core 15. Preferably, within each set 17, the thread-like elements 16 are at equal spaces and angles to each other. In particular, within each set 17, multiple (denser) thread-like elements are provided, preferably arranged on multiple longitudinal axes (the cores). In a preferred embodiment four coplanar thread-like elements 16 are provided that radially extend from the central core 15 and define 90° angles to each other. In another embodiment, not shown, the thread-like elements 16 can be constrained to the central core 15 so as to define a spiral path.

Preferably, within each assembly 11, 12 and 13, the cores 15 of the brushes 14 are coaxial.

Suitably, the free end/end portions of the thread-like elements 16 are intended to contact the tooth surface and/or the interdental spaces to be cleaned.

Suitably, the cores 15 of the brushes 14 of the three brushing assemblies 11, 12 and 13 extend longitudinally along directions that are substantially parallel to each other. Preferably, the brush cores 15 of the three assemblies all extend in parallel along the extension of the dental arch.

In particular, advantageously, in the device 1 according to the invention:
 the cores 15 of the brushes of the first brushing assembly 11 are facing and parallel to the vestibular surface of the teeth, and furthermore are suitably angled (preferably perpendicular) with respect to the extension in height of the teeth,
 the cores 15 of the brushes of the second brushing assembly 12 are facing and parallel to the lingual surface of the teeth, and furthermore are suitably angled (preferably perpendicular) with respect to the extension in height of the teeth,
 the cores 15 of the third brushing assembly 13 are facing and parallel to the occlusal surface of the teeth, and are further aligned along the arched extension of the dental arch.

Suitably, supports 27 are provided on the inner surface of the covering case 5 for mounting—preferably removably—the cores 15 of the brushes 14 of the brushing assemblies.

Suitably, the device 1 further comprises a motorized unit 18 which is advantageously housed inside said appendix 6 and which is connected—by an appropriate motion transmission system 19—to the cleaning elements of the three brushing assemblies so as to cause their movement.

In the particular case of use of brushes 14 as cleaning elements, in a preferred form, a further core has been added which can act longitudinally, preferably by emitting ultrasonic oscillations.

Advantageously, the motorized unit 18 comprises at least one electric motor, preferably with rotation speed of about 10-50 rpm, and preferably about 30 rpm. Suitably, the motorized unit 18 can comprise an ultrasonic motor and/or a piezoelectric motor.

Suitably, the motorized unit 18 is connected to an internal power source (not shown) that is preferably defined by a battery that is also housed within a compartment provided in said appendix 6. Advantageously, said appendix 6 can be provided with a connector—for example a USB interface—for connecting the device 1 to an external electrical source for charging said battery.

Advantageously, a control unit or controller (not shown) is housed in said appendix 6 to control the motorized unit. Preferably, said controller is a programmable logic controller (PLC) connected to the internal power source and/or the motorized unit 18. Advantageously, a receiver (e.g. a Bluetooth terminal) is housed within said appendix 6 that is connected to said control unit to receive from the outside— preferably via a portable device (e.g. a smartphone)—the commands for programming the motorized unit 18.

Suitably, the transmission system 19 comprises a series of gears for transferring the movement generated by the motor of the motorized unit 18 to the cleaning elements, for example, for transferring the rotation generated by the motor of the motorized unit 18 to the central core 15 of the brushes 14 so as to cause the rotation of the core itself, and therefore of the thread-like elements (bristles) 16 attached thereto.

Preferably, for an accurate adaptation of the vestibular-palatal diameter, the transmission system has been modified through the use of drive belts, as an alternative to washers (or toothed wheels). The "end" belt acting on the core of the brushing apparatus is interspersed between the rows of bristles (whether spirally arranged or arranged perpendicular to the tooth surface).

In essence, therefore, activating the motor of the motorized unit 18 simultaneously causes the movement of the cleaning elements of the three brushing assemblies 11, 12, 13 and thus the action of the free ends of the cleaning elements on the corresponding surfaces of the teeth and of the relative interdental spaces. For example, in the case of use of brushes 14 as cleaning elements, activating the motor of the motorized unit 18 simultaneously causes the rotation of the brushes 14 of the three brushing assemblies 11, 12 and 13, and thus the action of the thread-like elements 16 on the corresponding surfaces of the teeth and the relative interdental spaces.

Preferably, the motor of the motorized unit 18 and/or the transmission system 19 are configured so that the movement of the cleaning elements, e.g. the rotation of the brushes 14 of the first brushing assembly 11 (acting on the vestibular surface of the teeth) and the second brushing assembly 12 (acting on the lingual surface of the teeth) occurs according to a direction going from the gum/crown of the tooth towards its apex.

Suitably, in the case of use of brushes 14 as cleaning elements, the motor of the motorized unit 18 and/or the transmission system 19 are configured to cause a complete rotation (i.e. 360°, and therefore in a single direction of rotation) of the thread-like elements 16 of the brushes 14 around the rotation axis corresponding to the longitudinal extension of the central core 15. Suitably, in another embodiment, the motor of the motorized unit 18 and/or the transmission system 19 are configured to cause an incomplete rotation of the thread-like elements 16 (for example equal to or less than 180°, and therefore in alternating rotational directions) around said axis of rotation corresponding to the longitudinal extension of the central core 15, thereby acting on the teeth with a substantially undulating movement of said thread-like elements.

Suitably, the first brushing assembly 11 acting on the vestibular surface of the teeth and the second brushing assembly 12 acting on the lingual surface of the teeth extend for the entire dental arch, while the third brushing assembly 13—i.e., that acting at the occlusal surface—does not extend throughout the extension of the dental arch, but is configured (i.e. positioned and extends) to act only on the occlusal surface of the premolars and molars, and at most also the canines.

Therefore, substantially, the brushing apparatus 3 is configured so that—in use (i.e. when the brushing apparatus 3 and the covering case 5 are inserted inside the oral cavity)—at the incisors, and possibly also the canines, only the first brushing assembly 11 and the second brushing assembly 12 act.

Advantageously, therefore, the transmission system 19 is housed inside the supporting structure 4 so that—when the brushing apparatus 3 and the covering case 5 are inserted inside the oral cavity—they are substantially straddling the incisor teeth (i.e. in an area where only the first 11 and the second brushing assembly 12 are provided, and not the third brushing assembly 13). Preferably, the transmission system 19 is positioned at the medial axis of the covering case 15 and, in particular, in the space that is provided between the aforementioned two parts 10' and 10" defining the covering case 5 and from which the appendix 6 departs.

Suitably, on the inner surface of the covering case 5, for each brushing assembly 11, 12 and 13 corresponding areas (not shown) are provided for the removal and collection of the waste material captured from the ends of the cleaning elements, of each assembly, for example from the thread-like elements 16 of the brushes 14. Preferably, said removal and collection areas are defined/provided on the inner surface of the covering case 5 at a position that is downstream of the teeth 2 according to the rotation direction of the brushes 14 of each brushing assembly 11, 12 and 13. Advantageously, each area comprises a protruding section (rib or slat) that cooperates with the ends of the thread-like elements 16 to remove from the latter the waste material that said elements themselves have removed as a result of their contact with the corresponding tooth surface.

Alternatively to or in addition to the use of brushes 14, each brushing assembly 11, 12, 13 can comprise continuous brushed ribbons 14' as cleaning elements, wherein each ribbon comprises a first end connected to a supporting structure of the brushing assembly to which it is attached and a second free end for cleaning the teeth. In principle, the device 1 can consist of brushing assemblies 11, 12, 13 all comprising a plurality of brushes 14 or all comprising a plurality of continuous brushed ribbons 14'. However, a configuration is also conceivable in which the device 1 consists of a combination of brushing assemblies 11, 12, 13 with some comprising a plurality of brushes 14 and others a plurality of continuous brushed ribbons 14'. For example, two brushing assemblies comprising the brushes 14 and an assembly comprising the continuous brushed ribbons 14' or vice versa.

As shown in FIGS. 14 and 15, the geometries of the device 1 are slightly modified to have an increasing ability to adapt to anatomical variations and to have a further increase in the operating surface (cleaning). This capacity is obtained thanks to the possibility of determining a tilting movement of the cleaning elements in the forward and backward direction, i.e. the continuous ribbons 14'. The continuous brushed ribbons 14' are mounted on drive shafts and idle shafts (not shown in the figure). Both are mounted on tilting supports (on the masticatory plane) to achieve an ever greater adaptation to anatomical variations. The tilting supports are in turn secured to the device 1. The tilting movement can be coupled to a rotary or semi-rotatory movement generated by a roller system associated with the brushing assemblies.

The device 1 comprises a transmission box (not shown in the figure) having all the mechanisms and mechanical elements that carry motion from the (external) motor to the cleaning elements. To allow this movement, the box is equipped with three slots arranged at the drive shafts of the continuous brushed ribbons 14'. These shafts are located within the operating area at the mucogingival junction (vestibular side), gingival-palatal junction (lingual side), and at crown level for motion on the masticatory plane.

Following the path of motion, the motor pinion directly interfaces (by "male-female" interlocking) with the longitudinal shaft that puts two Archimedes screws in rotation along the same axis. These screws are arranged counterclockwise in the front to then have a motion—at the destination—that allows the continuous brushed ribbons 14' to run in the apico-coronal direction. The cylinder placed on the palatal side goes in the clockwise direction to have a reversal of motion and the maintenance of the apical-coronal direction. In this case, the direction of rotation on the masticatory plane is indifferent.

The front cylinder transmits motion to a toothed wheel (with which it interfaces directly) that is in continuity with a second toothed wheel.

The second toothed wheel transmits the motion to an additional toothed wheel located at the slot for the communication with the drive shaft. The transmission of motion at this point takes place through a toothed belt that will find, coaxially with the drive shaft, a third toothed wheel. The latter is coaxial to the drive shaft of the first brushed element and the relationship between these two elements is of the "male-female" type to allow the user the possible use of a single half-arch.

The rear cylinder also transmits the motion to a toothed wheel, with which it interfaces directly. This wheel is in (coaxial) continuity with two wheels: one for the motion to be provided to the masticatory plane drive shaft and the other to provide motion to the drive shaft at the gingival-palatal boundary, using the same technique as the vestibular (front) side.

The motion arrives through these paths inside the operating area and is transmitted to the three drive shafts correctly by the action on the tooth surface.

In particular, the continuous brushed ribbons 14' are mounted on sliding rollers connected to each other through joints similar to universal joints. The other rollers (present at the level of the masticatory edge of the tooth) are idle.

With respect to the transmission systems, the device 1 according to the present invention can comprise flexible secondary shafts placed therein. These flexible secondary shafts follow the profiles of the dental arches and have the task of generating a rotating motion on the different characteristic planes, near the teeth and gums. These flexible shafts are integrally fixed with movable cleaning elements, for example rotating, which perform the function of cleaning teeth and gums and which can have, as described above, a variety of forms, namely brushes (14), continuous brushed ribbons (14'), slides, etc.

The motion can be transferred to these flexible shafts by one or more primary shafts, connected to one or more drive devices capable of generating a torque, typically an electric motor. The device 1 is preferably positioned outside the oral cavity.

The primary shaft(s) has the task of transmitting motion to the flexible secondary shafts by means of joints or transmission systems capable of transmitting the torque.

In a first configuration, the flexible secondary shafts extend to the outside of the oral cavity, where they are made integral by means of removable joints, for example prismatic, with an equivalent number of drive devices, equipped with primary transmission shafts. Typically, each flexible shaft is made integral by means of an independent prismatic joint.

In a second configuration, the primary shaft is securely fixed to the motor and is rotated therefrom. In particular, it is coupled to the secondary shafts by means of magnetic joints, without it being necessary to realize a contact between the moving parts. These magnetic joints consist of permanent magnets with alternating poles, realized on both the primary shaft and the secondary shaft, and realize a transmission of torque by means of the subsequent attraction and repulsion interaction that occurs between adjacent magnets upon the rotation of the primary shaft.

In a third configuration, the primary shaft is securely fixed to the motor and is rotated therefrom. This is coupled to the secondary shafts by means of gear cascades, which can change the rotation speed of the secondary shafts, if necessary, by means of an adequate transmission ratio.

Advantageously, the device 1 according to the invention is configured to substantially modify the length of the arched longitudinal extension of the brushing apparatus 3 and the covering case 5 and/or to modify the curvature of said longitudinal extension (i.e. the distance/angle defined between the respective end portions of the brushing apparatus 3 and the covering case 5), thus allowing the adaptation of the device itself to palates of different lengths and/or widths.

Suitably, the two parts 10' and 10" of the covering case 5 are articulated with each other at an articulation joint 20—preferably a rotoidal joint—which is advantageously positioned at said appendix 6. In addition, advantageously, the aforementioned two parts 10 and 10' are joined together by a screw that is positioned between the covering case 5 and said articulation joint 20 and that is adjustable by means of a wheel 29 positioned thereon, thereby making it possible to modify their mutual distance (and thus the width of the device 1) in a manner substantially similar to the adjustment of the opening of the rods of a compass.

Advantageously, the covering case 5 has at least one longitudinally extensible portion 21 which preferably has a shape with an extensible and/or compressible portion (i.e. formed by an accordion-like folding casing) to allow the extension in length of said casing. Preferably, a bellows area is provided for each of the two parts 10' and 10" defining said covering case 5. Preferably, the bellows area is defined at an area of the covering case 5 which—when the latter is inserted inside the dental arch—is positioned between the outermost canine and the midpoint of the semi-arched longitudinal extension of each of the two parts 10' and 10"

defining said casing. Preferably the casing is perforated to further facilitate the removal of dirt by the bristles.

Advantageously, the covering case 5 is made of flexible material and, therefore, the brushing assemblies 11 and 12—which are mounted on said casing—can be mutually spaced depending on the size of the teeth that are inserted between said assemblies.

Advantageously, the cleaning elements of the brushing assemblies 11, 12 and 13 are longitudinally extensible. Suitably, to this purpose, in the case of use of brushes 14, the central cores 15 of the brushes 14 have an extensible configuration, preferably of the type with an extensible and/or compressible portion. In essence, therefore, the cores 15 of the brushes 14 are movable between at least one extended configuration (see FIG. 8, in which the adjacent series 17 of the radial thread-like elements 16 are further spaced along the longitudinal extension of the supporting central core 15) and a more compact configuration (see FIG. 7, wherein the adjacent series 17 of the radial thread-like elements 16 are closer together along the longitudinal extension of the supporting central core). Preferably the thread-like elements maintain the same proportion and/or distribution and/or density over the entire longitudinal length of the core. Similarly, the continuous brushed ribbons 14' can be connected to a longitudinal supporting structure (also defined as a central core) having an extensible configuration, preferably of the type with an extensible and/or compressible portion.

Preferably, for reasons of robustness, only the end portions of the cores 15 of the brushes 14 or the cores of the continuous brushed ribbons 14' are extensible. Preferably, the entire core is extendable to ensure the advantage that the thread-like elements (of the brushes 14 or of the ribbons 14') maintain the same proportion and/or distribution and/or density over the entire longitudinal length of the core. In particular, the difference in length (extension or contraction) is thus distributed over the entire longitudinal length and not only in the section concerned.

Advantageously, prior to insertion inside the oral cavity, the cleaning elements of the brushing assemblies 11, 12 and 13 and the covering case 5 are fully extended/elongated and, once they are inside the oral cavity, the user can act (for example by acting on the casing to push it onto the dental arch) to reduce their extension until they come into contact with the mandible. Only at this point, therefore, is the motor of the motorization unit 18 activated, which causes the movement of the cleaning elements, for example the rotation of the brushes 14, acting—by means of the free ends of the thread-like elements 16—on the teeth 2.

Preferably the adaptation can also take place following the recording (data collection) of the arch with another device ("plate"). The data is sent to the base station (dock) which proceeds to model the device on the basis of the data collected.

In particular, the device denoted as "plate" can be provided with a screen, on which the appendixes are shown (one for each half-arch) to be assembled to the central body to adapt the device to the anatomy and the conditions/characteristics of the arch in which it is intended to be inserted.

Advantageously, the device 1 can further comprise a self-adjusting pneumatic apparatus (not shown) for adapting the device itself to the anatomy and conditions/characteristics of the oral cavity in which it is intended to be inserted. Preferably, the pneumatic apparatus is also housed inside the covering case 5 and is configured to stabilize the brushing apparatus 3 by compressing the cleaning elements of the various brushing assemblies 11, 12 and 13 of said apparatus against the respective surfaces of the teeth 2.

Advantageously, the pneumatic apparatus comprises an inflatable structure, preferably modular, which is connected to a compressor to cause the inflation of said structure; preferably, the inflation (and thus the activation of the compressor and/or connection of the latter with the structure) is automatically interrupted upon reaching a predetermined pressure level. Suitably, the structure thus inflated can overcome any variations in position between the teeth, or their eventual absence, as well as allow a greater anchorage of the brushing apparatus 3 on the dental arch. Suitably, the pneumatic apparatus is connected to the control unit which thus also controls its activation/deactivation.

Advantageously, on the inner surface of the covering case 5 a seat is provided (not shown) for the positioning of a sanitizing element to sanitize the device 1. Suitably, such a sanitizing element is shaped like a film. Preferably, the sanitizing element is provided on the inner surface of the covering case 5 in a position that is upstream of the teeth 2 according to the movement of the cleaning elements, for example according to the direction of rotation of the brushes 14 of each brushing assembly 11, 12 and 13.

Advantageously, this sanitizing element contains suitable sanitizing substances that are released upon contact with the free ends of the cleaning elements, for example of the thread-like elements 16 of the brushes 14, preferably when the rotation of the latter is activated both inside and outside the oral cavity (i.e. before/after its use for cleaning teeth).

Preferably, the covering case 5 comprises perforations (not shown) to remove/release the sanitizing element and/or to primarily remove the waste material.

Suitably, the present invention also relates to a kit comprising the device 1 and a sanitizing element, preferably disposable, to be inserted inside the covering case 5 to sanitize said device.

Advantageously, the present invention further relates to a kit comprising the above-mentioned device 1 and a gelled toothpaste compound 25. Preferably, this compound 25 comprises a toothpaste sheet having a shape substantially corresponding to the arched extension of a dental arch (see FIG. 9). Suitably, the toothpaste sheet 25 contains a predefined amount of toothpaste which advantageously corresponds to that required for proper tooth cleaning.

Suitably, the toothpaste sheet 25 can be inserted inside the oral cavity prior to the insertion of the device 1 to thus be crushed between the corresponding antagonistic teeth of the upper and lower dental arches. In addition, it can be arranged on the bristled bodies of the cleaning elements prior to use and can be further applied in an automated manner by the charging station (dock).

Suitably, the gelled toothpaste compound 25—and in particular the toothpaste sheet—can be applied/positioned inside the covering case 5, between the brushing assemblies 11, 12 and 13, so that its application occurs following the insertion of the device 1 inside the oral cavity.

Advantageously, the aforementioned kit can also comprise a teeth whitening apparatus (not shown) to be removably inserted/positioned inside the covering case 5. Preferably, this teeth whitening apparatus can be housed inside the covering case 5 in place of the brushing apparatus 3 and, therefore, the insertion/positioning of the former is subordinate/subsequent to the removal of the latter. Suitably, the whitening apparatus comprises a series of light sources—preferably LEDs—activating a teeth whitening compound to be inserted/housed inside the covering case 5.

Suitably, the present invention also relates to a base apparatus 30—also called a dock—which is configured for recharging the battery provided in the device 1 for supplying the motorized unit 18.

Advantageously, said base apparatus 30 is also configured to clean the device 1 after use and/or sanitize it (preferably by ultraviolet radiation) and/or to load it with the toothpaste sheet 25.

In particular, this base apparatus 30 comprises a conventional type battery charger that is suitably connectable to the mains or other power source. Suitably, said base apparatus 30 further comprises a processor.

Suitably, the base apparatus 30 comprises a case 31 inside which said charger is housed and which is provided with an opening door 32 for removing a reception support (which is preferably mounted on a carriage) of the device.

Suitably, the base apparatus 30 further comprises an inner housing 35 for the device 1 and for keeping the internal battery of said device charged.

Advantageously, the present invention further comprises a plate (not shown) which is coated in silicone and which therein contains a grid of force, pressure and/or deformation sensors (e.g. capacitive or piezoelectric). In particular, once inserted inside the oral cavity at a dental arch, the plate detects the position of the teeth of the arch under analysis based on the pressure exerted by the teeth themselves on the grid sensors. Suitably, the plate is mechanically and electrically connectable to the device 1 so that the battery of the latter can supply the sensors of the plate itself. Advantageously, the plate shows on its own display the result of the collection of data carried out. Suitably, the grid sensors are electrically connected to the control unit of the device and advantageously, therefore, the signals representative of the measurements made by said sensors are stored in the controller and/or wirelessly transmitted to the base apparatus 30 for their processing.

Suitably, inside the processor of the base apparatus 30 software is loaded and/or run which is configured to provide—based on the measurements made by said sensors—the dimensions of the dental arch. In particular, the parameters calculated by said software comprise, for example, the arch length, the anteroposterior diameter, the transverse diameter, and the curvature angles at certain predefined detection points (land marks) on the dental arch.

Advantageously, as mentioned, the base apparatus 30 comprises an inner housing 35 which—preferably—is provided with a support 36 for engaging the device at some of its predefined detection points (land marks).

Advantageously, based on the measurements made by the sensors and the parameters calculated by the software, the support 36 on which the device is hooked is moved to thus adjust the length of the arched longitudinal extension of the device itself and/or the curvature of said arched longitudinal extension.

Advantageously, inside the base apparatus 30 a cleaning member is provided (for example a bristled/ciliated body) configured to act on the device 1 when it is inserted, with the concavity of the covering case 5 facing upwards, inside the internal housing compartment 35 provided in the apparatus. Suitably, the base apparatus 30 is configured to move the cleaning member along three axes orthogonal to each other and to move it forwards along the entire arched longitudinal extension of the device 1 in order to remove the waste material that has settled inside the case 5. In particular, in this way, the cleaning member causes the waste material to exit from the device 1, through the holes provided in its covering case 5, and its accumulation in a suitable reservoir provided in said base apparatus 30.

Advantageously, the base apparatus 30 also comprises at least one ultraviolet radiation source configured to send this radiation to all sides of the device 1 when the latter is inserted, with the concavity of the protective casing 5 facing upwards, inside the internal housing compartment 35 provided in the apparatus.

Advantageously, the base apparatus 30 also comprises a member (e.g. a head) for applying a toothpaste sheet 35 to the brushing apparatus 3 of the device 1 when the latter is inserted, with the concavity of the covering case 5 facing upwards, inside the internal housing compartment 35 provided in the apparatus.

Suitably, the use of the device 1 in combination with the base apparatus 30 allows automating all the various phases, also avoiding substantially any contact of the active part of the device (i.e. of the brushing apparatus 3 and the covering case 5) by the user.

Suitably, the base apparatus 30 is provided with means for wirelessly connecting with an external mobile device—for example a smartphone or a tablet—thereby enabling the exchange of data and/or the command and setting of said apparatus.

Suitably, the present invention also relates to a kit comprising a base apparatus 30 and a device 1 as described above.

It is clear from the above that the device according to the invention is particularly advantageous compared to traditional solutions in that:
  it allows cleaning the entire dental arch optimally and quickly; in particular, the combined and simultaneous action of the brushing assemblies on all the tooth surfaces, as well as at all the relative interdental spaces, allows obtaining correct dental hygiene, thus avoiding the common operating inaccuracies due to manual oral hygiene, with a particularly short treatment duration (for example, about 15 seconds for each arch),
  it is simple and easy to use, and also—not requiring a continuous movement—is particularly suitable for use even by people lacking or with a reduced range of movement,
  it is adaptable to oral cavities of different configurations and sizes, thus making it highly customizable,
  it allows the use of accessories such as toothpaste capsules and sanitizing films that make it easier and more effective to use.

The present invention also relates to a further associated device: an external casing (same shape as the main device, with the same adaptation properties) which internally houses an ultrasound sensor (CMUT) which, following a pre-established path (or guide) that completely covers all the sides of the entire arch, proceeds with the analysis of the gingival and dental tissue. This information is transmitted to the base station (dock) for recording, analysis, elaboration and further processing.

The "dock" allows at least one of the following functions: recording, analysis, elaboration and processing of the data collected by the other devices.

Advantageously, additional parameters (detection points or land marks) are encoded for the adaptation of the oral device.

For a more accurate measurement aimed at calculating the operating surfaces, the detection points (land marks) have been coded (FIG. 13). It follows that these points are applied to both the device and the dental arch. In addition to the three points corresponding to the bilateral posterior end and the midline, four additional detection points (land marks) have been added, obtained through the internal and external tangent of the incisor arch, namely:

σ corresponding to the medial posterior point of the last molar;
γ corresponding to the external tangent coinciding with the anterior incisor arch;
α corresponding to the lateral (vestibular) margin of the last molar;
β corresponding to the internal tangent coinciding with the posterior incisor arch;
ε corresponding to the midpoint between γ and β".

The detection points (land marks) are intended for the vestibular side and/or the lingual/palatal side.

The present invention has been illustrated and described in some of its preferred embodiments, but it is understood that variations can in practice be made to them, without departing from the scope of the present industrial invention patent.

The invention claimed is:

1. A device for dental hygiene, in particular for cleaning teeth of a dental arch of an oral cavity, said device comprising:
   a brushing apparatus configured to wrap simultaneously all teeth of the upper dental arch or of the lower dental arch, said brushing apparatus comprising a plurality of movable cleaning elements configured to clean the teeth with free ends thereof,
   a supporting structure comprising a covering case configured to be entirely inserted inside the oral cavity and to support and accommodate therein said brushing apparatus, said supporting structure also comprising an appendix associated with said covering case or said brushing apparatus and which, when said covering case is positioned inside the oral cavity, is configured to come out at least in part from the oral cavity through an oral fissure, and
   a motorization unit configured to implement in movement said cleaning elements, wherein said brushing apparatus comprises:
      at least a first brushing assembly comprising a plurality of cleaning elements arranged and configured to act on a vestibular surface of the teeth,
      at least a second brushing assembly comprising a plurality of cleaning elements arranged and configured to act on a lingual surface of the teeth, and
      at least a third brushing assembly comprising a plurality of cleaning elements arranged and configured to act on an occlusal surface of the teeth;
      wherein said covering case comprises at least one longitudinally extendable portion and wherein said longitudinally extendable portion of said covering case is configured as a bellows.

2. The device according to claim 1, wherein said covering case has a substantially arched longitudinal extension to substantially cover all the teeth of the upper or lower dental arch and has a concave cross section to cover the vestibular, lingual, and occlusal surfaces of the teeth, and said appendix defines a handle to hold and move said device and defines a casing for said motorized unit and for a battery for supplying said motorized unit.

3. The device according to claim 2, wherein said motorized unit comprises a single electric motor and a transmission system for transmitting the motion generated by said motor to all said cleaning elements of said first, second, and third brushing assemblies, said transmission system being provided in correspondence with a medial area of said arcuate longitudinal extension of said covering case and/or of said brushing apparatus.

4. The device according to claim 3, wherein said motorized unit and/or said transmission system are configured to cause a movement of said cleaning elements of said first brushing assembly, acting on the vestibular surface of the teeth, and of said second brushing assembly, acting on the lingual surface of the teeth, according to a rotation direction going from the gum/crown of the tooth towards its apex.

5. The device according to claim 2, wherein said covering case is subdivided into two parts in correspondence with the medial area of its arcuate longitudinal extension, said two parts being articulated to each other in an adjustable manner around a pin mounted in correspondence with said appendix.

6. The device according to claim 1, wherein said cleaning elements comprise rotating brushes provided with a core with a longitudinal extension from which radially depart a plurality of thread-like elements, and wherein the first brushing assembly comprises a plurality of said brushes arranged and configured to act on the vestibular surface of the teeth, said second brushing assembly comprises a plurality of said brushes arranged and configured to act on the lingual surface of the teeth, and said third brushing assembly comprises a plurality of said brushes arranged and configured to act on the occlusal surface of the teeth.

7. The device according to claim 6, wherein said cores of said brushes of said first, second, and third brushing assemblies extend longitudinally along the extension of the dental arch and along respective directions that are substantially parallel to each other.

8. The device according to claim 6, wherein said cores of said brushes are longitudinally extendable and compressible.

9. The device according to claim 1, wherein said cleaning elements comprise continuous brushed ribbons, wherein said first brushing assembly comprises a plurality of said continuous brushed ribbons arranged and configured to act on the vestibular surface of the teeth, said second brushing assembly comprises a plurality of said continuous brushed ribbons arranged and configured to act on the lingual surface of the teeth, sand said third brushing assembly comprises a plurality of said continuous brushed ribbons arranged and configured to act on the occlusal surface of the teeth.

10. The device according to claim 9, wherein said motorization unit is configured to provide a tilting movement of said cleaning elements in a forward and backward direction, and said cleaning elements are located on drive shafts and idle shafts, wherein each of said first, second, and third brushing assemblies is coupled to one drive shaft, respectively.

11. The device according to claim 10 further comprising a transmission box provided with three slots disposed in correspondence with said drive shafts of said first, second, and third brushing assemblies of said continuous brushed ribbons.

12. Dental cleaning kit comprising a device according to claim 1 and at least one of the following accessories:
   a gelled toothpaste compound to be inserted inside the covering case of said device or to be placed in the oral cavity before insertion, inside the oral cavity, of the covering case and the brushing apparatus of said device,
   a teeth whitening apparatus to be inserted removably into the covering case of said device, or
   a sanitizing element for sanitizing said device.

13. The dental cleaning kit according to claim 12, wherein said sanitizing element is disposable.

14. A dental cleaning kit comprising a device according to claim 1 and a base apparatus configured to interface electrically and mechanically with said device for at least one of:
  recharging a battery provided in said device,
  automatically cleaning after use the covering case and the brushing device of said device,
  sanitizing said device, or
  positioning a toothpaste compound inside the covering case of said device, in correspondence with the brushing apparatus.

15. The dental cleaning kit according to claim 14, wherein said base apparatus is configured for sanitizing said device using ultraviolet radiation.

16. The device for dental hygiene, in particular for cleaning teeth of a dental arch of an oral cavity, said device comprising:
  a brushing apparatus configured to wrap simultaneously all teeth of the upper dental arch or of the lower dental arch, said brushing apparatus comprising a plurality of movable cleaning elements configured to clean the teeth with free ends thereof,
  a supporting structure comprising a covering case configured to be entirely inserted inside the oral cavity and to support and accommodate therein said brushing apparatus, said supporting structure also comprising an appendix associated with said covering case or said brushing apparatus and which, when said covering case is positioned inside the oral cavity, is configured to come out at least in part from the oral cavity through an oral fissure, and
  a motorization unit configured to implement in movement said cleaning elements,
  wherein said brushing apparatus comprises:
    at least a first brushing assembly comprising a plurality of cleaning elements arranged and configured to act on a vestibular surface of the teeth,
    at least a second brushing assembly comprising a plurality of cleaning elements arranged and configured to act on a lingual surface of the teeth, and
    at least a third brushing assembly comprising a plurality of cleaning elements arranged and configured to act on an occlusal surface of the teeth;
  wherein said cleaning elements comprise rotating brushes provided with a core with a longitudinal extension from which radially depart a plurality of thread-like elements, and wherein the first brushing assembly comprises a plurality of said brushes arranged and configured to act on the vestibular surface of the teeth, said second brushing assembly comprises a plurality of said brushes arranged and configured to act on the lingual surface of the teeth, and said third brushing assembly comprises a plurality of said brushes arranged and configured to act on the occlusal surface of the teeth.

17. The device for dental hygiene, in particular for cleaning teeth of a dental arch of an oral cavity, said device comprising:
  a brushing apparatus configured to wrap simultaneously all teeth of the upper dental arch or of the lower dental arch, said brushing apparatus comprising a plurality of movable cleaning elements configured to clean the teeth with free ends thereof,
  a supporting structure comprising a covering case configured to be entirely inserted inside the oral cavity and to support and accommodate therein said brushing apparatus, said supporting structure also comprising an appendix associated with said covering case or said brushing apparatus and which, when said covering case is positioned inside the oral cavity, is configured to come out at least in part from the oral cavity through an oral fissure, and
  a motorization unit configured to implement in movement said cleaning elements,
  wherein said brushing apparatus comprises:
    at least a first brushing assembly comprising a plurality of cleaning elements arranged and configured to act on a vestibular surface of the teeth,
    at least a second brushing assembly comprising a plurality of cleaning elements arranged and configured to act on a lingual surface of the teeth, and
    at least a third brushing assembly comprising a plurality of cleaning elements arranged and configured to act on an occlusal surface of the teeth;
  wherein said cleaning elements comprise continuous brushed ribbons, wherein said first brushing assembly comprises a plurality of said continuous brushed ribbons arranged and configured to act on the vestibular surface of the teeth, said second brushing assembly comprises a plurality of said continuous brushed ribbons arranged and configured to act on the lingual surface of the teeth, sand said third brushing assembly comprises a plurality of said continuous brushed ribbons arranged and configured to act on the occlusal surface of the teeth.

18. A dental cleaning kit comprising a device for dental hygiene,
  in particular for cleaning teeth of a dental arch of an oral cavity, said device comprising:
  a brushing apparatus configured to wrap simultaneously all teeth of the upper dental arch or of the lower dental arch, said brushing apparatus comprising a plurality of movable cleaning elements configured to clean the teeth with free ends thereof,
  a supporting structure comprising a covering case configured to be entirely inserted inside the oral cavity and to support and accommodate therein said brushing apparatus, said supporting structure also comprising an appendix associated with said covering case or said brushing apparatus and which, when said covering case is positioned inside the oral cavity, is configured to come out at least in part from the oral cavity through an oral fissure, and
  a motorization unit configured to implement in movement said cleaning elements,
  wherein said brushing apparatus comprises:
    at least a first brushing assembly comprising a plurality of cleaning elements arranged and configured to act on a vestibular surface of the teeth,
    at least a second brushing assembly comprising a plurality of cleaning elements arranged and configured to act on a lingual surface of the teeth, and
    at least a third brushing assembly comprising a plurality of cleaning elements arranged and configured to act on an occlusal surface of the teeth;
  wherein said dental cleaning kit comprises at least one of the following accessories:
    a gelled toothpaste compound to be inserted inside the covering case of said device or to be placed in the oral cavity before insertion, inside the oral cavity, of the covering case and the brushing apparatus of said device,
    a teeth whitening apparatus to be inserted removably into the covering case of said device, or
    a sanitizing element for sanitizing said device.

19. A dental cleaning kit comprising a device for dental hygiene, in particular for cleaning teeth of a dental arch of an oral cavity, said device comprising:
- a brushing apparatus configured to wrap simultaneously all teeth of the upper dental arch or of the lower dental arch, said brushing apparatus comprising a plurality of movable cleaning elements configured to clean the teeth with free ends thereof,
- a supporting structure comprising a covering case configured to be entirely inserted inside the oral cavity and to support and accommodate therein said brushing apparatus, said supporting structure also comprising an appendix associated with said covering case or said brushing apparatus and which, when said covering case is positioned inside the oral cavity, is configured to come out at least in part from the oral cavity through an oral fissure, and
- a motorization unit configured to implement in movement said cleaning elements,
- wherein said brushing apparatus comprises:
  - at least one first brushing assembly comprising a plurality of cleaning elements arranged and configured to act on a vestibular surface of the teeth,
  - at least one second brushing assembly comprising a plurality of cleaning elements arranged and configured to act on a lingual surface of the teeth, and
  - at least a third brushing assembly comprising a plurality of cleaning elements arranged and configured to act on an occlusal surface of the teeth;
- wherein said dental cleaning kit comprises a base apparatus configured to interface electrically and mechanically with said device for at least one of:
  - recharging a battery provided in said device,
  - automatically cleaning after use the covering case and the brushing device of said device,
  - sanitizing said device, or
  - positioning a toothpaste compound inside the covering case of said device, in correspondence with the brushing apparatus.

* * * * *